United States Patent [19]

Malin et al.

[11] Patent Number: 4,744,968
[45] Date of Patent: May 17, 1988

[54] STABILIZED AQUEOUS HYDROGEN PEROXIDE SOLUTION

[75] Inventors: Michael J. Malin, Park Ridge; Louis D. Sclafani, Carmel, both of N.J.

[73] Assignee: Technicon Instruments Corporation, Tarrytown, N.Y.

[21] Appl. No.: 772,114

[22] Filed: Sep. 3, 1985

[51] Int. Cl.$^4$ .............................................. C01B 15/037
[52] U.S. Cl. .................................. 423/272; 423/584; 252/186.29; 8/111
[58] Field of Search .............................. 423/272, 584; 252/186.29, 186.28, 186.27; 210/759; 8/111

[56] References Cited

U.S. PATENT DOCUMENTS

| 3,687,627 | 8/1972 | Stalter | 423/584 |
| 3,801,512 | 4/1974 | Solenberger | 423/272 |
| 3,977,826 | 8/1976 | Iscowitz | 252/186.29 |
| 3,998,751 | 12/1976 | Murray | 252/186.21 |
| 4,061,721 | 12/1977 | Strong | 423/272 |
| 4,132,762 | 1/1979 | Kim | 423/272 |
| 4,304,762 | 12/1981 | Leigh | 423/272 |
| 4,421,668 | 12/1983 | Cox et al. | 423/272 |
| 4,470,919 | 9/1984 | Goffinet et al. | 252/186.29 |
| 4,497,725 | 2/1985 | Smith et al. | 423/272 |
| 4,614,646 | 9/1986 | Christiansen | 423/272 |

OTHER PUBLICATIONS

*The Merck Index*, 10th ed. (1983) at 43, entry 41.
Markham et al., *J. Phys. Chem.*, 66 (1962), 932.
Bray et al., *J. Am. Chem. Soc.*, 72 (1950), 1401.
Jefcoate et al., *J. Chem. Soc.*, (1968), 48.

*Primary Examiner*—Helen M. S. Sneed
*Assistant Examiner*—Anthony McFarlane
*Attorney, Agent, or Firm*—Morgan & Finnegan

[57] ABSTRACT

This invention relates to a novel stabilized aqueous hydrogen peroxide solution which comprises hydrogen peroxide in admixture with an aromatic polysulfonic acid, or a salt thereof.

11 Claims, No Drawings

STABILIZED AQUEOUS HYDROGEN PEROXIDE SOLUTION

BACKGROUND OF THE INVENTION

Solutions of hydrogen peroxide are known to have uses in such diverse fields as rocket propulsion, bleaching, pharmaceutical preparations, mouthwashes, dentifrices and medical diagnostic chemistries. Recently, the use of hydrogen peroxide solutions in high-speed, automated, biomedical analytical systems has been disclosed.

One major disadvantage in the use of hydrogen peroxide solutions is degradation known to occur as a result of exposure to sunlight, Merck Index, Tenth Ed., 1983, p. 697, No. 4706. In addition, such solutions are subject to the dismutation of hydrogen peroxide, which occurs when metal ions are present, Kirk-Othmer Encyclopedia of Chemical Technology, 2d Ed., Vol. 2, pp. 394–5.

The prevention of such hydrogen peroxide degradation cannot be accomplished by most known metal ligands. Such compounds which contain carboxyl groups, i.e., ethylene diaminetetraacetic acid (EDTA), are ineffective for this purpose because commercially available hydrogen proxide solutions generally have a relatively low pH (~3) due to the instability of hydrogen peroxide in alkaline solutions.

What is desired, therefore, is a hydrogen peroxide solution which is not degradable by metal ions which may be present in the solution water or the tank walls or containers used to prepare, store or ship the solution. In addition, because it is highly desirable that hydrogen peroxide solutions are packaged and shipped in translucent containers, such a hydrogen peroxide solution should substantially free from light-induced degradation of hydrogen peroxide.

SUMMARY OF THE INVENTION

The present invention relates to stabilized hydrogen peroxide solutions. More particularly, the invention relates to aqueous hydrogen peroxide solutions which comprise water, hydrogen peroxide, and an aromatic polysulfonic acid or salt thereof.

DETAILED DESCRIPTION OF THE INVENTION

This invention relates to a stabilized aqueous hydrogen peroxide solution which comprises water, hydrogen peroxide, and an aromatic polysulfonic acid or salts thereof.

The solutions of hydrogen peroxide within contemplation of this invention range from about 0.1% volume/volume (v/v) to about 90% hydrogen peroxide depending upon the end use intended for the solution. For instance, a 90% solution of hydrogen peroxide may be used in rocket propulsion, a 3% solution may be used as a bleaching agent and in pharmaceutical preparations, mouthwashes and dentifrices, and a 0.3% solution may be used as a component of a peroxidase stain for biological cells. Other uses for hydrogen peroxide solutions of varying concentrations are known to those skilled in the art.

Aqueous hydrogen peroxide solutions are easily prepared by known methods and are widely commercially available. Generally, a mineral acid such as a substituted aromatic phosphonic acid, is added in order to stabilize the solution because hydrogen peroxide is known to be destabilized in alkaline solutions. *Adv. Inorg. Chem.*, supra. Ideally, sufficient acid is added to bring the pH of the hydrogen peroxide solution to a level of from about 2.5 to 4.0.

An aromatic polysulfonic acid is used in the composition of the present invention because it possesses optimal geometry for chelating metal ions, especially Fe III and Cu II, which may be present in the water use to make hydrogen peroxide solutions. At any pH greater than about 1, the sulfonate moieties of the sulfonic acid are fully ionized and the molecule thereby acts as a poly-dentate ligand. Deactivation of metal ions is achieved, for instance by the formation of octahedral complexes in which three molecules of the sulfonic acid compound ligate one molecule of Fe III. Suitable aromatic sulfonic acid compounds include o-benzene disulfonic acid; m-benzene disulfonic acid; 1,2,4,5-benzene tetrasulfonic acid; 1,4,5,8-naphthalene tetrasulfonic acid; and 1,8-naphthalene disulfonic acid. Ideally, the aromatic sulfonic acid is o-benzene disulfonic acid. The composition may be used in the free acid form or, preferably, as the sodium, potassium, lithium or other salts thereof. The aromatic sulfonic acid may be present in the solution of this invention in an amount of from about 0.86 mMol/L to about 1.62 mMol/L. Ideally, it is present in an amount of from about 1.05 mMol/L to about 1.43 mMol/L.

Acetanilide may also be present in the solution of this invention in order to substantially inhibit the degradation of hydrogen peroxide due to the exposure thereof to light. Although the exact mechanism for such inhibitive action is not known with certainty, one hypothesis is that the acetanilide is hydroxylated in the presence of hydrogen peroxide and sunlight and thus acts as a light-block. Ideally, acetanilide is present in the solution of this invention in an amount of from about 0.74 mMol/L to about 2.22 mMol/L. More preferably, acetanilide is present at from about 1.11 mMol/L to about 1.85 mMol/L.

Although not required, it is preferred in making the hydrogen peroxide solution of this invention that the water used be deionized water, especially where the solution is being used in a peroxidase stain for biological cells. Ideally, the water is distilled, deionized water so as to substantially remove trace (neutral) organic compounds, trace metal compounds and other ionic compounds via deionization.

To form the stabilized aqueous hydrogen peroxide solution of this invention, the following components are combined in admixture: water, hydrogen peroxide an aromatic polysulfonic acid and a mineral acid.

The following comparative examples are illustrative of the invention. Whereas they are presented to further facilitate an understanding of the inventive concepts, they are in no way to be interpreted as limiting the present invention. In each of the following examples, dashes are indicative of experiments which were not measured or performed.

EXAMPLE I

A solution of 0.34% hydrogen peroxide in deionized water was prepared and separated into a number of portions. Into each portion was added an amount of Ferric ion ranging from 0–2.0 parts per million. Various additives were also added to the portions as indicated. Each portion was stored in the dark at 45° for the indicated amount of time, and analyzed for hydrogen peroxide content in duplicate, with a mean relative deviation of ±3%, by the Worthington Statzyme Kit Method available from American Scientific Products of Edison, N.J. The results are shown in Table I.

hydrogen peroxide to light, whereas solutions which do not comprise an aromatic sulfonic acid and acetanilide suffer significant hydrogen peroxide decomposition, even in the dark.

TABLE I

| Additive | Fe, ppm added | $H_2O_2$ Concentration, g/dl | | | % original $H_2O_2$ Retained | |
|---|---|---|---|---|---|---|
| | | Initial | 4 weeks/ 45° C. | 7 weeks/ 45° C. | 4 weeks/ 45° C. | 7 weeks/ 45° C. |
| OBDS[a] | 0 | 0.34 | 0.27 | — | 79 | — |
| OBDS | 1.0 | " | 0.23 | — | 69 | — |
| OBDS, Acetanilide[b] | 0 | " | 0.33 | — | 98 ± 2[d] | — |
| OBDS, Acetanilide | 1.0 | " | 0.32 | — | 92 ± 2[d] | — |
| EDTA[c] | 0 | " | 0.25 | — | 72 | — |
| EDTA[c] | 0.1 | " | 0.014 | — | 4.1 | — |
| EDTA[c] | 0.5 | " | 0.010 | — | 2.8 | — |
| EDTA[c] | 1.0 | " | 0.007 | — | 2.0 | — |
| EDTA[c] | 2.0 | " | 0 | — | 0 | — |
| Acetanilide | 0.1 | " | 0.25 | — | 75 | — |
| Acetanilide | 0.3 | " | 0.16 | — | 48 | — |
| Acetanilide | 0.5 | " | 0.034 | — | 10 | — |
| Acetanilide | 1.0 | " | 0 | — | 0 | — |
| OBDS, Acetanilide | 0 | " | 0.30 | — | 89 | — |
| OBDS, Acetanilide | 0.1 | " | — | 0.28 | — | 83 |
| OBDS, Acetanilide | 0.5 | " | — | 0.22 | — | 64 |
| OBDS, Acetanilide | 1.0 | " | — | 0.16 | — | 47 |
| OBDS, Acetanilide | 2.0 | " | — | 0.037 | — | 11 |

[a]o-benzene disulfonic acid, dipotassium salt, final concentration 314 mg/L [1.0 mM/1].
[b]acetanilide final concentration 203 mg/L [1.5 mMol/L].
[c]ethylenediaminetetraacetic acid, disodium salt final concentration 372 mg/L [1.0 mMol/L].
[d]this experiment was conducted twice and the mean and relative deviation are given.

It can readily be observed from Example I that the degradation of hydrogen peroxide by the presence of metal ions is substantially inhibited by o-benzene disulfonic acid. Neither ethylenediaminetetraacetic acid nor acetanilide is successful in substantially inhibiting said degradation, although a combination of acetanilide with OBDS is more effective than OBDS alone.

EXAMPLE II

The stabilization of hydrogen peroxide against the degradation caused by sunlight was tested by preparing a solution of 0.3% hydrogen peroxide by the dilution of a 30% solution of hydrogen peroxide obtained from Kodak Company of Rochester, NY (Lot #F11B) with deionized water. The solution was divided into four portions as follows: Portion A had added to it 1.24 mMol/L of o-benzene disulfonic acid, dipotassium salt and 1.48 mMol/L of acetanilide and was stored in a clear container exposed to sunlight. Portion B had added to it 1.24 mMol/L of o-benzene disulfonic acid, dipotassium salt and 1.48 mMol/L of acetanilide and was stored in the dark. Portion C did not have any additives and was stored in a clear container exposed to sunlight. Portion D did not have any additives and was stored in the dark.

Each portion was assayed after time for hydrogen peroxide content by means of the Worthington Statzyme Kit which was calibrated against D-glucose and had a mean standard deviation of ±0.7%. The results are shown in Table II.

TABLE II

| | $H_2O_2$ Concentration (mMol/L) | | | |
|---|---|---|---|---|
| Portion | Initial | 1 Month | 2 Months | 3 Months |
| A | 89 | 85 | 79 | 77 |
| B | 89 | 90 | 87 | 89 |
| C | 80 | 3 | — | — |
| D | 80 | 40 | — | — |

It can readily be observed that the composition of the present invention provides significant stabilization of

What is claimed is:

1. A stabilized aqueous hydrogen peroxide solution having a pH below 7 and an amount of Ferric ion up to about 2 ppm comprising hydrogen peroxide, acetanilide having a concentration which ranges between 0.74 mMol/L and 2.22 mMol/L, and o-benzene disulfonic acid or salt thereof at a concentration between about 0.86 mMol/L to about 1.62 mMol/L.

2. The hydrogen peroxide solution of claim 1 wherein hydrogen peroxide is present at from about 0.01% to about 30%.

3. The hydrogen peroxide solution of claim 2 wherein hydrogen peroxide is present at from about 0.1% to about 0.5%.

4. A hydrogen peroxide solution of claim 1 wherein said o-benzene disulfonic acid is present in an amount of from about 1.05 mMol/L to about 1.43 mMol/L.

5. The hydrogen peroxide solution of claim 1 wherein acetanilide is present at from about 1.11 mMol/L to about 1.85 mMol/L.

6. A stabilized aqueous hydrogen peroxide solution having an amount of Ferric ion up to about 2 ppm comprising:
    (a) from about 0.1% to about 0.5% hydrogen peroxide;
    (b) from about 0.86 mMol/L to about 1.45 mMol/L of o-benzene disulfonic acid, or a salt thereof; and
    (c) from about 1.11 mMol/L to about 1.85 mMol/L of acetanilide.

7. A method of preparing a stabilized hydrogen peroxide solution having an amount of Ferric ion up to about 2 ppm comprising combining in admixture deionized water, hydrogen peroxide, acetanilide having a concentration which ranges between 0.74 mMol/L and 2.22 mMol/L and an o-benzene disulfonic acid or salt thereof in a concentration of about 0.86 mMol/L to about 1.62 mMol/L.

8. The method of claim 7 wherein said hydrogen peroxide is present at from about 0.01% to about 30%.

9. The method of claim 8 wherein hydrogen peroxide is present at from about 0.1% to about 0.5%.

10. The method of claim 9 where said o-benzene disulfonic acid is present from about 1.05 mMol/L to about 1.43 mMol/L.

11. The method of claim 7 wherein acetanilide is present from about 1.11 mMol/L to about 1.85 mMol/L.

* * * * *